(12) United States Patent
Macready et al.

(10) Patent No.: US 9,875,215 B2
(45) Date of Patent: Jan. 23, 2018

(54) SYSTEMS AND METHODS THAT FORMULATE PROBLEMS FOR SOLVING BY A QUANTUM PROCESSOR USING HARDWARE GRAPH DECOMPOSITION

(71) Applicant: D-Wave Systems Inc., Burnaby (CA)

(72) Inventors: William Macready, West Vancouver (CA); Aidan Patrick Roy, Surrey (CA)

(73) Assignee: D-Wave Systems Inc., Burnaby (CA)

( * ) Notice: Subject to any disclaimer, the term of this patent is extended or adjusted under 35 U.S.C. 154(b) by 546 days.

(21) Appl. No.: 14/109,657

(22) Filed: Dec. 17, 2013

(65) Prior Publication Data

US 2014/0324933 A1 Oct. 30, 2014

Related U.S. Application Data

(60) Provisional application No. 61/738,961, filed on Dec. 18, 2012.

(51) Int. Cl.
*G06F 17/10* (2006.01)
*G06N 99/00* (2010.01)

(52) U.S. Cl.
CPC ........... *G06F 17/10* (2013.01); *G06N 99/002* (2013.01)

(58) Field of Classification Search
CPC .............................. G06F 17/10; G06N 99/002
See application file for complete search history.

(56) References Cited

U.S. PATENT DOCUMENTS

| | | | |
|---|---|---|---|
| 7,135,701 B2 | 11/2006 | Amin et al. | |
| 7,418,283 B2 | 8/2008 | Amin | |
| 7,533,068 B2 | 5/2009 | Maassen van den Brink et al. | |
| 7,788,192 B2 | 8/2010 | Amin | |
| 7,870,087 B2 | 1/2011 | Macready et al. | |
| 7,876,248 B2 | 1/2011 | Berkley et al. | |
| 7,984,012 B2 | 7/2011 | Coury et al. | |
| 8,008,942 B2 | 8/2011 | van den Brink et al. | |
| 8,032,474 B2 | 10/2011 | Macready et al. | |
| 8,035,540 B2 | 10/2011 | Berkley et al. | |
| 8,073,808 B2 | 12/2011 | Rose | |
| 8,174,305 B2 | 5/2012 | Harris | |

(Continued)

FOREIGN PATENT DOCUMENTS

| | | |
|---|---|---|
| WO | 2012/064974 A2 | 5/2012 |
| WO | 2013/006836 A1 | 1/2013 |

OTHER PUBLICATIONS

Choi, Vickey, Minor-embedding in adiabatic quantum computation I. The parameter setting problem, Sep. 17, 2008, Springer Science+Business Media, pp. 193-209.*

(Continued)

*Primary Examiner* — Andrew Caldwell
*Assistant Examiner* — Emily Larocque
(74) *Attorney, Agent, or Firm* — Seed IP Law Group LLP

(57) ABSTRACT

Systems and methods formulate problems for solving by a quantum processor using hardware graph decomposition. A decomposition of a primal graph may be built in a first stage based on a hardware specific graph, and refined in a second stage by, for example, removing vertices from the decomposition. The hardware specific graph may be a graph that is specific to a piece of hardware, for instance a quantum processor comprising a plurality of qubits and couplers operable to communicatively couple pairs of qubits.

12 Claims, 10 Drawing Sheets

(56) References Cited

U.S. PATENT DOCUMENTS

| | | | |
|---|---|---|---|
| 8,190,548 | B2 | 5/2012 | Choi |
| 8,195,596 | B2 | 6/2012 | Rose et al. |
| 8,244,662 | B2 | 8/2012 | Coury et al. |
| 2008/0052055 | A1 | 2/2008 | Rose et al. |
| 2008/0218519 | A1* | 9/2008 | Coury ............... G06T 11/206 345/440 |
| 2011/0022820 | A1 | 1/2011 | Bunyk et al. |
| 2011/0231462 | A1 | 9/2011 | Macready et al. |

OTHER PUBLICATIONS

Klymko, Christine et al, Adiabatic Quantum Programming Minor Embedding With Hard Faults, Nov. 7, 2012, pp. 1-12.*

Bunyk, P. D-Wave processor control circuitry, 2009, pp. 11-13.*

Boros et al, Local Search Heuristics for Quadratic Unconstrained Binary Optimization (QUBO), 2007, J. Heuristics, 13, pp. 99-132.*

Choi, Minor-Embedding in Adiabatic Quantum Computation: II. Minor-Universal Graph Design, Oct. 13, 2010, Springer, pp. 343-353.*

Amin, "Effect of Local Minima on Adiabatic Quantum Optimization," arXiv:0709.0528v2 [quant-ph] Apr. 4, 2008, 4 pages.

Roy, A.P., "Systems and Methods that Formulate Embedding of Problems for Solving by a Quantum Processor," U.S. Appl. No. 14/109,663, filed Dec. 17, 2013, 63 pages.

Macready et al., "Systems and Methods that Formulate Problems for Solving by a Quantum Processor," U.S. Appl. No. 61/857,993, filed Jul. 24, 2013, 87 pages.

Choi, "Minor-embedding in adiabatic quantum computation: II. Minor-universal graph design," *Quantum Inf Process* 10:343-353, 2011.

Roy, "Systems and Methods That Formulate Embeddings of Problems for Solving by a Quantum Processor," Office Action, dated Jan. 29, 2016, for U.S. Appl. No. 14/109,663, 25 pages.

* cited by examiner

SYSTEMS AND METHODS THAT FORMULATE PROBLEMS FOR SOLVING BY A QUANTUM PROCESSOR USING HARDWARE GRAPH DECOMPOSITION

BACKGROUND

Field

The present systems and methods generally relate to use of quantum processors, and particularly relate to the use of quantum processors to minimize an objective function.

Description of the Related Art

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems and methods, an "adiabatic" evolution is considered to be an evolution that satisfies the adiabatic condition:

$$\dot{s}|\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and δ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in, for example, U.S. Pat. No. 7,135,701 and U.S. Pat. No. 7,418,283.

Quantum Annealing

Quantum annealing is a computation method that may be used to find a low-energy state, typically preferably the ground state, of a system. Somewhat similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly than classical annealing. It is known that the solution to a hard problem, such as a combinatorial optimization problem, may be encoded in the ground state of a system Hamiltonian (e.g., the Hamiltonian of an (sing spin glass) and therefore quantum annealing may be used to find the solution to such a hard problem. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D,$$

where Γ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing Γ). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close to the exact solution. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of Γ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

Quantum Processor

A quantum processor may take the form of a superconducting quantum processor. A superconducting quantum processor may include a number of qubits and associated local bias devices, for instance two or more superconducting qubits. A superconducting quantum processor may also employ coupling devices (i.e., "couplers") providing communicative coupling between qubits. Further details and embodiments of exemplary quantum processors that may be used in conjunction with the present systems and methods are described in, for example, U.S. Pat. No. 7,533,068, U.S. Pat. No. 8,008,942, US Patent Publication 2008-0176750 (now U.S. Pat. No. 8,195,596), US Patent Publication 2009-0121215 (now U.S. Pat. No. 8,190,548), and US Patent Publication 2011-0022820.

Quadratic Unconstrained Binary Optimization Problems

A quadratic unconstrained binary optimization ("QUBO") problem is a form of discrete optimization problem that involves finding a set of N binary variables $\{x_i\}$ that minimizes an objective function of the form:

$$E(x_1, \ldots, x_N) = \sum_{i \leq j}^{N} Q_{ij} x_i x_j$$

where Q is typically a real-valued upper triangular matrix that is characteristic of the particular problem instance being studied. QUBO problems arise in many different fields, for example machine learning, pattern matching, and statistical mechanics, to name a few.

Programming a Quantum Processor

A quantum processor may interact with a digital computer and may be programmed and/or operated via instructions sent from the digital computer. However, the way in which the quantum processor is programmed, and how its operation is involved in an algorithm for solving a problem, may depend on many factors. As described in PCT Patent Application Serial No. PCT/US2012/045843 and in accordance with the present systems and methods, a quantum processor may be programmed and operated to determine a solution to a computational problem via at least two approaches: a direct mapping approach and a sampling approach.

Direct Mapping Approach

A problem may comprise a number of variables, and using the direct mapping approach to solve the problem, each variable may be mapped to and/or represented by at least one qubit in a quantum processor. The types of problems that may be solved by this approach, as well as the relative size and complexity of such problems, typically depend on many factors. Two such factors may include the number of qubits in the quantum processor and the connectivity between the qubits in the quantum processor. Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of communicably coupling to up to three other qubits without any intervening qubits. In other words, there are communicative paths directly available to three other qubits, while in any particular application any number (i.e., 0, 1, 2, or 3) of those communicative paths may be employed. In a quantum processor employing coupling devices between qubits, this would mean a qubit having a connectivity of three is communicably directly coupleable to three other quits via three respective coupling devices. Traditionally, the number of qubits in a quantum processor limits the size of problems that may be solved and the connectivity between the qubits in a quantum processor limits the complexity of the problems that may be solved.

Examples of applications that employ the direct mapping approach include: US Patent Publication 2008-0052055, which describes solving a protein folding problem by first casting the protein folding problem as an Ising spin glass problem and then directly mapping the Ising spin glass problem to a quantum processor; U.S. Pat. No. 8,073,808, which describes solving a computational problem (e.g., an image-matching problem) by first casting the problem as a quadratic unconstrained binary optimization ("QUBO") problem and then mapping the QUBO problem directly to a quantum processor; and US Patent Publication 2011-0231462, which describes solving logic circuit representations of computational problems by mapping each individual logic gate to a respective miniature optimization problem having an output that is "optimized" if the truth table of the logic gate is satisfied. In all of these examples, a problem is solved by first casting the problem in a contrived formulation (e.g., Ising spin glass, QUBO, etc.) because that particular formulation maps directly to the particular embodiment of the quantum processor. In other words, an intermediate formulation is used to re-cast the original problem into a form that accommodates the number of qubits and/or connectivity constraints in the particular quantum processor.

Techniques for performing direct mapping of a problem to a quantum processor (e.g., techniques generating for generating an intermediate formulation, such as a QUBO problem) are described in at least U.S. Pat. No. 7,418,283, U.S. Pat. No. 7,135,701, U.S. Pat. No. 7,788,192, U.S. Pat. No. 7,533,068, U.S. Pat. No. 8,008,942, U.S. Pat. No. 7,984,012, U.S. Pat. No. 8,244,662, U.S. Pat. No. 8,190,548, U.S. Pat. No. 8,174,305, and US Patent Publication 2011-0231462, each of which is incorporated herein by reference in its entirety.

The "direct mapping" approach of re-casting a problem in an intermediate formulation can work well for some problems but can also be impractical for other problems. For example, casting a computational problem as a QUBO problem requires casting the computational problem in a form allowing only pair-wise interactions between qubits. Any higher-order interactions need to be broken down into pair-wise terms in order to be re-cast in QUBO form. Many computational problems have higher-order (i.e., beyond pair-wise) interactions between variables, and these problems can require significant pre-processing in order to be re-cast in QUBO form. Furthermore, breaking down higher-order interactions into pair-wise terms can force multiple qubits to be used to represent the same variable, meaning the size of the problem that can be solved is reduced. It is for at least these reasons that the alternative "sampling approach" to programming quantum processors has been developed.

Sampling Approach

The sampling approach to programming a quantum processor is described in PCT Patent Application Serial No. PCT/US2012/045843, which is hereby incorporated by reference in its entirety.

In brief, the sampling approach to programming a quantum processor involves using a digital computer to define an objective function which takes, as input, a bit string (i.e., a sequence of 0s and 1s) and outputs a real number. The quantum processor is called to provide a set of bit strings, or "samples," where each bit in the bit string corresponds to the state of a respective qubit in the quantum processor after a quantum computation/operation/algorithm is performed. The quality of each sample is then assessed by plugging it into the objective function on the digital computer to determine the corresponding real number output. The quantum processor intrinsically provides samples from a probability distribution, where the shape of the probability distribution depends on a configuration of programmable parameters (i.e., the same programmable parameters that are used to define a QUBO in the direct mapping approach). High probability samples in the quantum processor's probability distribution may correspond to low-energy states of the quantum processor. In other words, the quantum processor may intrinsically tend to provide samples from low-energy states (e.g., by performing adiabatic quantum computation and/or quantum annealing). The focus of the sampling approach to programming a quantum processor is to make these low-energy states of the quantum processor correspond to bit strings that produce desirable real number outputs in the objective function. This may be achieved by shaping the probability distribution of the quantum processor so that high-probability samples (e.g., low-energy states) correspond to bit strings that produce desirable real number outputs from the objective function. Thus, after the first samples from the quantum processor are assessed by determining their corresponding real number outputs, the programmable parameters of the quantum processor may be adjusted to re-shape the probability distribution of the quantum processor and increase the probability of producing desirable real number outputs and/or increase the desirability of at least some of the real number outputs produced.

Compared to the direct mapping approach, the sampling approach to programming a quantum processor is less dependent on the architecture of the processor itself and may enable a broader range of problems to be solved. In many applications, it can also be considerably more straightforward to program a quantum processor via the sampling approach than via the direct mapping approach.

BRIEF SUMMARY

A method for finding a decomposition for a primal graph having a number of vertices and a number of edges may be summarized as including, in a first stage, building a decomposition of the primal graph, by at least one circuit, given a hardware specific graph, the building by: sequentially adding each vertex in the primal graph to the decomposition, wherein: each vertex in the primal graph is associated with a connected subgraph in a set of connected subgraphs that is a first representation of the decomposition, each edge in the primal graph is represented as a path from a first respective connected subgraph and a second respective connected subgraph, and sequentially adding of a vertex in the primal graph to the decomposition which minimizes a measure of the decomposition via execution of a greedy algorithm; in a second stage, following the first stage, refining, by the at least one circuit, the decomposition created in the first stage by: removing in sequence each vertex from the decomposition, reading the vertex into the decomposition to minimizes the measure of the decomposition; and returning the decomposition.

The method for finding a decomposition for a primal graph having a number of vertices and a number of edges may further include receiving the primal graph and the hardware specific graph.

The hardware specific graph may be a Chimera graph. The measure of the decomposition may be over the first representation of the decomposition. The measure of the decomposition over the first representation of the decomposition may be proportional to the length of the connected subgraphs the set of connected subgraphs. The measure of the decomposition may be over a second representation of the decomposition, the second representation of the decomposition may be a plurality of bags, and each bag may be a set of one or more variables represented at one or more qubit that includes a respective bag-width. The measure of the decomposition over the second representation of the decomposition may include a summation over the bag-width of the decomposition. The measure of the decomposition over the second representation of the decomposition may include a maximum bag-width of the bag-width of the decomposition. The measure of the decomposition may be over the second representation of the decomposition, and may include a maximum bag-width of a number of bag-widths of the decomposition. Sequentially adding a vertex in the primal graph to the decomposition may further include: finding a minimum cost qubit the hardware specific graph; and finding a weighted shortest path through a set of unused vertices in the hardware specific graph. The primal graph may be associated with a quadratic unconstrained binary optimization (QUBO) problem, the hardware specific graph may be representative of least one quantum processor that includes a plurality of qubits and a plurality of couplers.

A method for solving a quadratic unconstrained binary optimization (QUBO) problem may be summarized as including: receiving a decomposition of a primal graph, wherein the decomposition of the graph includes a plurality of bags; assigning a truth assignment to a plurality of variables associated with the primal graph by at least one circuit; while the truth assignment has not converged: for each bag in the plurality of bags, conducting a local search from the truth assignment to generate a candidate set of new truth assignments by the at least one circuit; comparing the truth assignment to the candidate set of new truth assignments by the at least one circuit; and updating the truth assignment with the best of the candidate set of truth assignments if a new truth assignment from the candidate set of new truth assignments is better than truth assignment by the at least one circuit.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
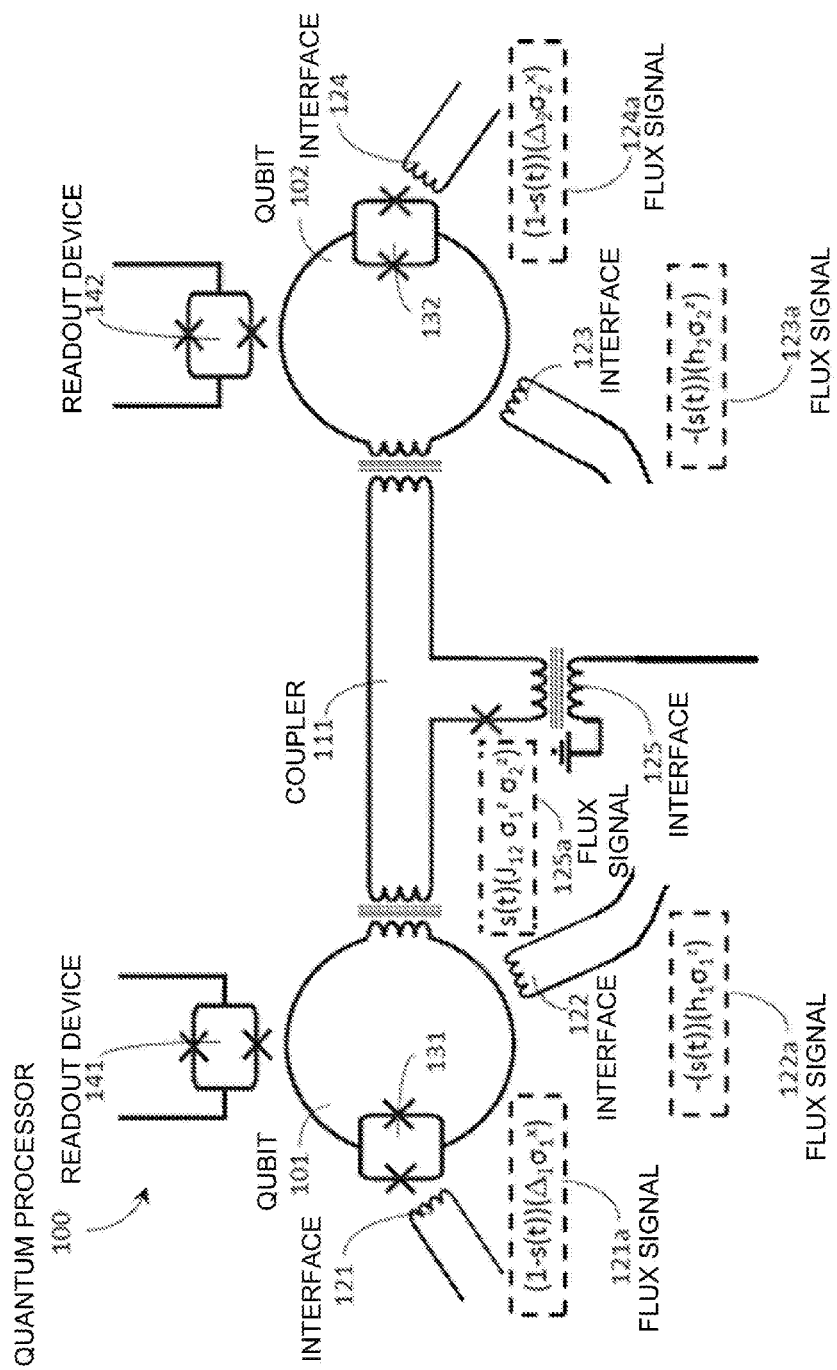
FIG. 1 is a schematic diagram of a portion of an exemplary superconducting quantum processor designed for AQC (and/or quantum annealing) that may be used to implement the present systems and methods.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors, drive circuitry and non-transitory computer- or processor-readable media such as nonvolatile memory for instance read only memory (ROM), electronically erasable programmable ROM (EEPROM) or FLASH memory, etc., or volatile memory for instance static or dynamic random access memory (ROM) have not been shown or described in detail to avoid unnecessarily obscuring descriptions of the embodiments of the present systems and methods. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors, including a grid or distributed network of multiple quantum processors. It should also be noted that the term "or" is generally employed in its sense including "and/or" unless the content clearly dictates otherwise.

The headings provided herein are for convenience only and do not interpret the scope or meaning of the embodiments.

The various embodiments described herein provide systems and methods for solving computational problems via a quantum processor. As previously described, a quantum processor may comprise an architecture including a number of qubits and a number of coupling devices providing controllable communicative coupling between qubits (e.g., between respective pairs of qubits). The architecture of a quantum processor is typically fixed; in other words, the number of qubits in the architecture is fixed, and the connectivity between qubits (i.e., the number of available couplings each qubit has to other qubits) is also fixed. As a result of the architecture being fixed, there is a need in the art for techniques that facilitate solving problems of different structures via a quantum processor. For example, solving a problem that has more variables than the fixed number of qubits in the quantum processor may employ the problem decomposition techniques described in U.S. Pat. No. 7,870,087 and U.S. Pat. No. 8,032,474, both of which are incorporated herein by reference in their entirety, whereby a large problem that does not "fit" in the quantum processor is decomposed into sub-problems that do fit in the quantum processor. The present systems and methods provide, among other things, techniques for recombining (e.g., "stitching back together") the sub-solutions to such sub-problems in order to establish a solution to the original full-sized problem.

A further consequence of the quantum processor architecture being fixed is that the available connectivity may not provide couplings between all variables and, inevitably, some problem formulations may include variable couplings that are not available in the quantum processor architecture. The present systems and methods provide techniques for overcoming sparseness in the connectivity of the quantum processor architecture by reformulating problems in ways that are more amenable to being solved via the quantum processor.

Throughout this specification, the term "hardware" is generally used to refer to a quantum processor. Thus, the phrases "in hardware" and "by the hardware" and the like generally refer to "via the quantum processor" and similar, as the context reasonably dictates.

Throughout this specification, the term hardware graph and specific architecture are generally used to refer to the specific fixed architecture of a quantum processor (i.e., the fixed number of qubits and connectivity between qubits in the quantum processor architecture). Throughout this specification, the term "Chimera" is generally used to refer to the specific fixed architecture of a quantum processor. Thus, a Chimera architecture may be represented in a graph where the fixed number of qubits correspond to nodes and the fixed connectivity between qubits corresponds to the edges between nodes. An example of a Chimera architecture is $C_2$. This is a 2 by 2 array of $K_{4,4}$ bipartite graph unit cells. In the $C_2$ there are 32 nodes and 80 edges. An example of a Chimera architecture is $C_8$. This is a 8 by 8 array of $K_{4,4}$ bipartite graph unit cells. In the $C_8$ there are 512 nodes and 1472 edges. In some embodiments, not all nodes or edges in a hardware graph are available.

In accordance with some embodiments of the present systems and methods, a quantum processor may be designed to perform adiabatic quantum computation and/or quantum annealing. As previously discussed, a typical adiabatic evolution may be represented by Equation 1:

$$H_e = (1-s)H_{In} + sH_f \quad (1)$$

where $H_{In}$ is the initial Hamiltonian, $H_f$ is the final or "problem" Hamiltonian, $H_e$ is the evolution or instantaneous Hamiltonian, and s is the evolution coefficient which controls the rate of evolution. In general, s may vary from 0 to 1 with time t as s(t). A common approach to adiabatic quantum computation ("AQC"), described, for example, in Amin, M. H. S., "Effect of local minima on quantum adiabatic optimization", PRL 100, 130503 (2008), is to start with an initial Hamiltonian of the form shown in Equation 2:

$$H_{In} = -\frac{1}{2}\sum_{i=1}^{N}\Delta_i \sigma_i^x \quad (2)$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. An initial Hamiltonian of this form may, for example, be evolved to a final Hamiltonian of the form:

$$H_f = -\frac{\varepsilon}{2}\left[\sum_{i=1}^{N}h_i\sigma_i^z + \sum_{i,j=1}^{N}J_{ij}\sigma_i^z\sigma_j^z\right] \quad (3)$$

where N represents the number of qubits, $\sigma_i^z$ is the Pauli z-matrix for the $i^{th}$ qubit, $h_i$ and $J_{i,j}$ are dimensionless local fields coupled into each qubit, and $\varepsilon$ is some characteristic energy scale for $H_f$. Here, the $\sigma_i^z$ and $\sigma_i^z\sigma_j^z$ terms are examples of "diagonal" terms. Throughout this specification, the terms "final Hamiltonian" and "problem Hamiltonian" are used interchangeably. Hamiltonians such as $H_{In}$ and $H_f$ in Equations 2 and 3, respectively, may be physically realized in a variety of different ways. A particular example is realized by an implementation of superconducting qubits.

FIG. 1 is a schematic diagram of a portion of an exemplary superconducting quantum processor 100 designed for AQC (and/or quantum annealing) that may be used to implement the present systems and methods. The portion of superconducting quantum processor 100 shown in FIG. 1 includes two superconducting qubits 101, 102 and a tunable ZZ-coupler 111 coupling information therebetween (i.e., providing pair-wise coupling between qubits 101 and 102). While the portion of quantum processor 100 shown in FIG. 1 includes only two qubits 101, 102 and one coupler 111, those of skill in the art will appreciate that quantum processor 100 may include any number of qubits and any number of coupling devices coupling information therebetween.

The portion of quantum processor 100 shown in FIG. 1 may be implemented to physically realize AQC and/or QA by initializing the system with the Hamiltonian described by equation 2 and evolving the system to the Hamiltonian described by equation 3 in accordance with the evolution described by equation 1. Quantum processor 100 includes a plurality of interfaces 121-125 that are used to configure and control the state of quantum processor 100. Each of interfaces 121-125 may be realized by a respective inductive coupling structure, as illustrated, as part of a programming subsystem and/or an evolution subsystem. Such a programming subsystem and/or evolution subsystem may be separate from quantum processor 100, or it may be included locally (i.e., on-chip with quantum processor 100) as described in, for example, U.S. Pat. No. 7,876,248 and U.S. Pat. No. 8,035,540.

In the operation of quantum processor 100, interfaces 121 and 124 may each be used to couple a flux signal into a respective compound Josephson junction 131, 132 of qubits 101 and 102, thereby realizing the $\Delta_i$ terms in the system Hamiltonian. This coupling provides the off-diagonal $\sigma^x$ terms of the Hamiltonian described by equation 2 and these flux signals are examples of "disordering signals." Similarly, interfaces 122 and 123 may each be used to couple a flux signal into a respective qubit loop of qubits 101 and 102, thereby realizing the $h_i$ terms in the system Hamiltonian. This coupling provides the diagonal $\sigma^z$ terms of equation 3. Furthermore, interface 125 may be used to couple a flux signal into coupler 111, thereby realizing the term(s) in the system Hamiltonian. This coupling provides the diagonal $\sigma_i^z\sigma_j^z$ terms of equation 3. In FIG. 1, the contribution of each of interfaces 121-125 to the system Hamiltonian is indicated in boxes 121a-125a, respectively. Thus, throughout this specification and the appended claims, the terms "problem formulation" and "configuration of a number of programmable parameters" are used to refer to, for example, a specific assignment of $h_i$ and $J_{ij}$ terms in the system Hamiltonian of a superconducting quantum processor via, for example, interfaces 121-125.

Throughout this specification and the appended claims, the term "quantum processor" is used to generally describe a collection of physical qubits (e.g., qubits 101 and 102) and couplers (e.g., coupler 111). The physical qubits 101 and 102 and the couplers 111 are referred to as the "programmable elements" of the quantum processor 100 and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 122, 123, and 125) used to apply the programmable parameters (e.g., the $h_i$ and $J_{ij}$ terms) to the programmable elements of the quantum processor 100 and other associated control circuitry and/or instructions. As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions. Similarly, in the context of a quantum processor, the term "evolution subsystem" is used to generally describe the interfaces (e.g., "evolution interfaces" 121 and 124) used to evolve the programmable elements of the quantum processor 100 and other associated control circuitry and/or instructions. For example, the evolution subsystem may include annealing signal lines and their corresponding interfaces (121, 124) to the qubits (101, 102).

Quantum processor 100 also includes readout devices 141 and 142, where readout device 141 is configured to read out the state of qubit 101 and readout device 142 is configured to read out the state of qubit 102. In the embodiment shown in FIG. 1, each of readout devices 141 and 142 comprises a respective DC-SQUID that is configured to inductively couple to the corresponding qubit (qubits 101 and 102, respectively). In the context of quantum processor 100, the term "readout subsystem" is used to generally describe the readout devices 141, 142 used to read out the final states of the qubits (e.g., qubits 101 and 102) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication 2012-064974.

While FIG. 1 illustrates only two physical qubits 101, 102, one coupler 111, and two readout devices 141, 142, a quantum processor (e.g., processor 100) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Figure 2:
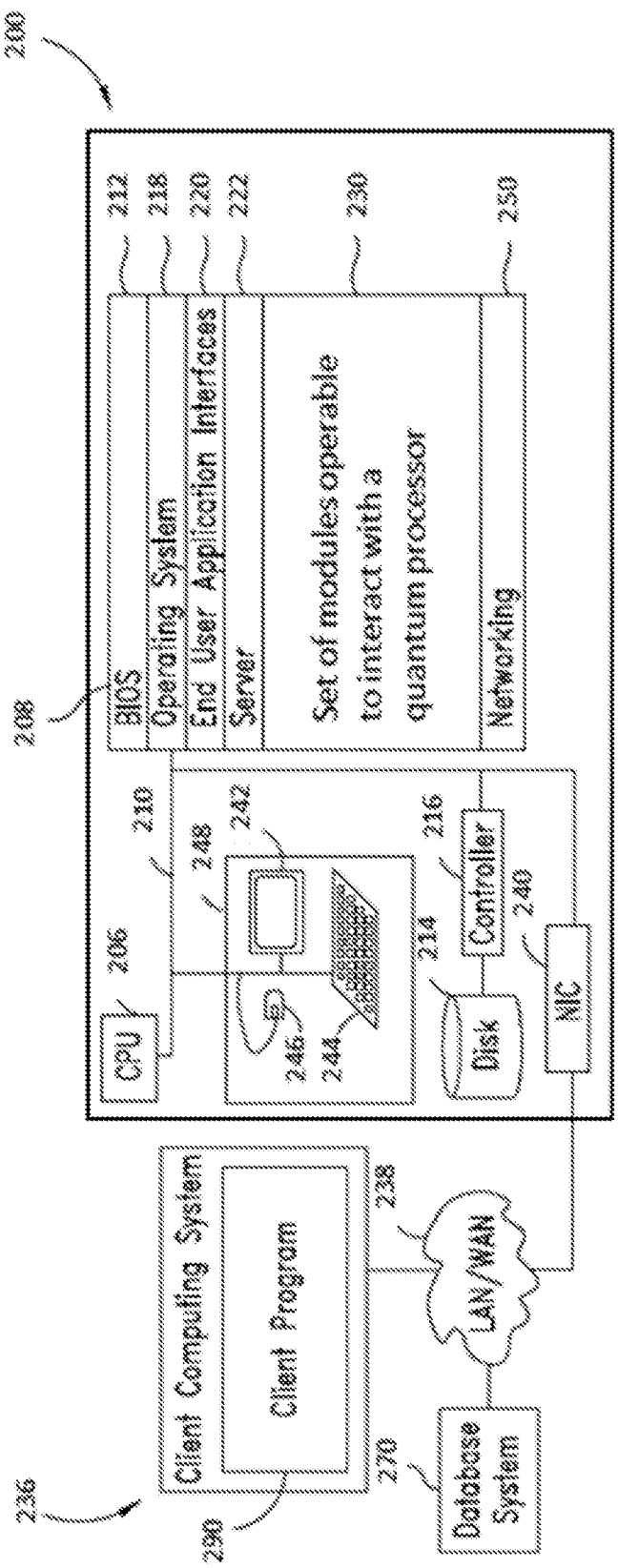
FIG. 2 illustrates an exemplary digital computer including a digital processor that may be used to perform classical digital processing tasks described in the present systems and methods.

FIG. 2 illustrates an exemplary digital computer 200 including a digital processor 206 that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like. The present systems and methods can also be practiced in distributed computing environments, where tasks or modules are performed by remote processing devices, which are linked through a communications network. In a distributed computing environment, program modules may be located in both local and remote memory storage devices.

Digital computer 200 may include at least one processing unit 206 (i.e., digital processor), at least one system memory 208, and at least one system bus 210 that couples various system components, including system memory 208 to digital processor 206. Digital computer 200 will at times be referred to in the singular herein, but this is not intended to limit the application to a single digital computer 200. For example, there may be more than one digital computer 200 or other classical computing device involved throughout the present systems and methods.

Digital processor 206 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 2 are of conventional design. As a result, such blocks need not be described in further detail herein, as they will be understood by those skilled in the relevant art.

System bus 210 can employ any known bus structures or architectures, including a memory bus with a memory controller, a peripheral bus, and a local bus. System memory 208 may include non-volatile memory such as read-only memory ("ROM") and volatile memory such as random access memory ("RAM") (not shown). A basic input/output system ("BIOS") 212, which can form part of the ROM, contains basic routines that help transfer information between elements within digital computer 200, such as during startup.

Digital computer 200 may also include other non-volatile memory 214. Non-volatile memory 214 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 214 may communicate with digital processor 206 via system bus 210 and may include appropriate interfaces or controllers 216 coupled between non-volatile memory 214 and system bus 210. Non-volatile memory 214 may serve as long-term storage for computer-readable instructions, data structures, program modules and other data for digital computer 200. Although digital computer 200 has been described as employing hard disks, optical disks and/or magnetic disks, those skilled in the relevant art will appreciate that other types of non-volatile computer-readable media may be employed, such a magnetic cassettes, flash memory cards, Bernoulli cartridges, Flash, ROMs, smart cards, etc.

Various program modules, application programs and/or data can be stored in system memory 208. For example, system memory 208 may store an operating system 218, end user application interfaces 220 and server applications 222. In accordance with the present systems and methods, system memory 208 may store at set of modules 230 operable to interact with a quantum processor (not shown in FIG. 2). In some embodiments, system memory 208 stores a decomposition module 232. The decomposition module 232 implements some of the method shown in FIG. 4. In some embodiments, system memory 208 stores a local search module 234. The local search module 234 implements some of the method shown in FIG. 10. In some embodiments, system memory 208 stores a graph techniques module 236. The graph techniques module 236 provides standard graph processing techniques like traversing a graph, determining the presence of a cycle, calculating the length of a weighted path, and the like.

System memory 208 may also include one or more networking applications 250, for example, a Web server application and/or Web client or browser application for permitting digital computer 200 to exchange data with sources via the Internet, corporate Intranets, or other networks, as well as with other server applications executing on server computers. Networking application 250 in the depicted embodiment may be markup language based, such as hypertext markup language ("HTML"), extensible hyper-text markup language ("XHTML"), extensible markup language ("XML") or wireless markup language ("WML"), and may operate with markup languages that use syntactically delimited characters added to the data of a document to represent the structure of the document. A number of Web server applications and Web client or browser applications are commercially available, such as those available from Mozilla and Microsoft.

While shown in FIG. 2 as being stored in system memory 208, operating system 218 and various applications/modules 220, 222, 230, 250 and other data can also be stored in nonvolatile memory 214.

Digital computer 200 can operate in a networking environment using logical connections to at least one client computer system 236 and at least one database system 270. These logical connections may be formed using any means of digital communication, for example, through a network 238, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 200 may be connected to the LAN through an adapter or network interface card ("NIC") 240 (communicatively linked to system bus 210). When used in a WAN networking environment, digital computer 200 may include an interface and modem (not shown), or a device such as NIC 240, for establishing communications over the WAN. Non-networked communications may additionally, or alternatively be employed.

In a networked environment, program modules, application programs, data, or portions thereof can be stored outside of digital computer 200. Those skilled in the relevant art will recognize that the logical connections shown in FIG. 2 are only some examples of establishing communications between computers, and other connections may also be used.

While digital computer 200 may generally operate automatically, an end user application interface 220 may also be provided such that an operator can interact with digital computer 200 through different user interfaces 248, including output devices, such as a monitor 242, and input devices, such as a keyboard 244 and a pointing device (e.g., mouse 246). Monitor 242 may be coupled to system bus 210 via a video interface, such as a video adapter (not shown). Digital computer 200 can also include other output devices, such as speakers, printers, etc. Other input devices can also be used, including a microphone, joystick, scanner, etc. These input devices may be coupled to digital processor 206 via a serial port interface that couples to system bus 210, a parallel port, a game port, a wireless interface, a universal serial bus ("USB") interface, or via other interfaces.

NIC 240 may include appropriate hardware and/or software for interfacing with the elements of a quantum processor (not shown). In other embodiments, different hardware may be used to facilitate communications between digital computer 200 and a quantum processor. For example, digital computer 200 may communicate with a quantum processor via a direct electrical connection (e.g., via Universal Serial Bus, Firewire, or the like), a wireless connection (e.g., via a Wi-Fi® network), or an Internet connection.

Client computer system 236 may comprise any of a variety of computing devices communicatively coupled to digital computer 200, and may include a client program 290 configured to properly format and send problems directly or indirectly to server application 222. Once digital computer 200 has determined a solution, server application 222 may be configured to send information indicative of this solution back to client program 290.

The various embodiments described herein provide systems and methods for interacting with quantum processors. More specifically, the various embodiments described herein provide systems and methods for using a classical digital computer to communicate with a quantum processor via a multi-level software architecture comprising a set of modules, where at least one of the modules abstracts away from the machine language of the quantum processor to enable a user to employ familiar programming techniques to interact with the quantum processor.

In the various embodiments described herein, a digital computer (e.g., classical or digital computer 200) may be used to interact with a quantum processor. A quantum processor may include a number of programmable elements, and interacting with a quantum processor may include programming the quantum processor with a particular problem formulation and/or configuration of programmable parameters by assigning specific values to these programmable elements. Interacting with a quantum processor may also include evolving the quantum processor (e.g., performing adiabatic quantum computation and/or quantum annealing) to determine a solution to the particular problem and reading out the solution from the quantum processor.

Figure 3:
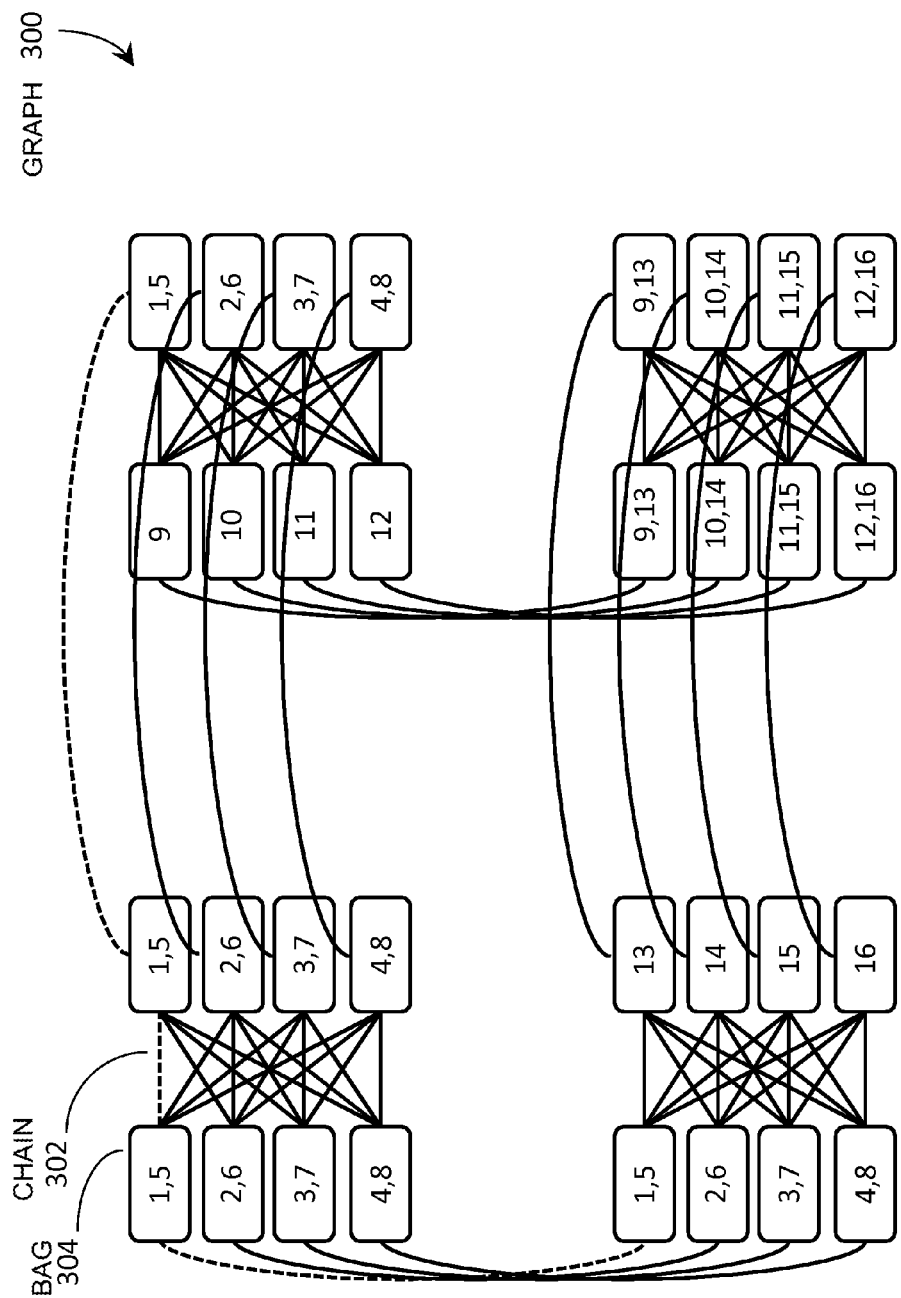
FIG. 3 illustrates an exemplary hardware graph decomposition given a complete graph as a primal graph, according to at least one implementation of the present systems and methods.

FIG. 3 illustrates an exemplary hardware graph decomposition given a complete graph as a primal graph. Many problems present a QUBO that does not fit into the hardware graph because it has too many variables, or too many interactions between variables. In accordance with the present systems and methods, solving such problems via the quantum processor may be facilitated by casting individual qubits to represent multiple variables. In other words, multiple variables may be mapped to the same qubit such that the state of that qubit represents specific configurations of the multiple variables.

Assume the original problem is represented by the primal graph G=(V, E) where V is a set of vertices and E set of edges. The primal graph, also known as the problem graph, is found in the adjacency information in the QUBO. The vertices of this graph represent the binary variables of the QUBO, and two variables are adjacent if there is a nonzero quadratic interaction term between them. Let the hardware graph be denoted $G_H=(V_H, E_H)$. Then a (specific) hardware decomposition of G is defined by a collection of subgraphs of $G_H$, one for each vertex of V. These subgraphs are called chains, denoted $S_i$, i∈V. Each variable is represented by a chain in the hardware graph such that if two variables are adjacent in the primal graph there is an edge between the chains in the hardware graph. Each chain can be thought of as having a unique qubit root. An edge in the primal graph is presented as a path in the hardware graph. In some embodiments, a chain is a linear structure; in some embodiments a chain is a tree; in some embodiments the chain is a cycle; and in some embodiments the chain includes a tree and a cycle. In some embodiments, every chain $S_i$ is a nonempty connected subgraph. In some embodiments, if indices i and j are adjacent in G, then $S_i$ and $S_j$ either share a common vertex, or have at least one edge between them in $G_H$. A chain is a plurality of qubits representing one variable.

An example of a Chimera decomposition of the complete graph on 16 vertices is given in FIG. 3 (using $C_2$ as the hardware graph $G_H$). If all of the chains $S_i$ are disjoint, then a hardware decomposition of $G_H$ is simply a minor-embedding of G into $G_H$. However, while many primal graphs are too large to be minor-embedded into G, a hardware decomposition of G can always be found.

The usefulness of a hardware decomposition depends on how many variables (vertices of V) are represented by a single physical qubit (vertex of $V_H$). A bag is a plurality of variables represented at one qubit. In some embodiment, a bag is defined as set $B_q$, q∈$V_H$, to be the set of vertices of G represented at qubit q:

$$B_q = \{i \in V : q \in S_i\}. \quad (4)$$

The bag-width or hardware-width of a hardware decomposition is the size of the largest bag. That is, the bag-width is the number of variables represented at each qubit. A decomposition with bag-width 1 is a minor-embedding. The decomposition in FIG. 3 has a bag-width of 2. There are at most two variables associated with a qubit. Multiple qubits have 2 variables associated with the respective qubits. In the graph 300 in a Chimera decomposition of the complete graph $K_{16}$ is embedded in the hardware specific graph, C2.

The chain S1 (302) is drawn with stippled lines. An example bag 304 of width 2, and including variables 1, and 5 is included in the chain.

Figure 9:
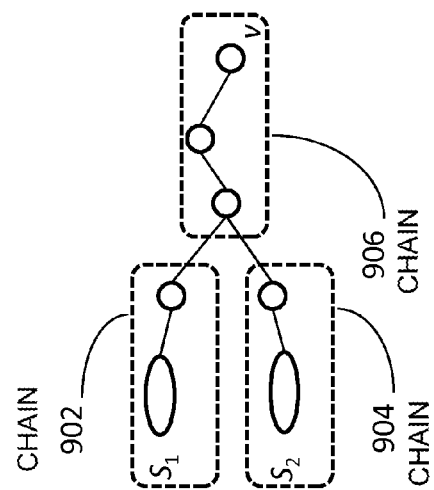
FIG. 9 illustrates an exemplary method of adding a chain to a decomposition, according to at least one implementation of the present systems and methods.
Figure 10:
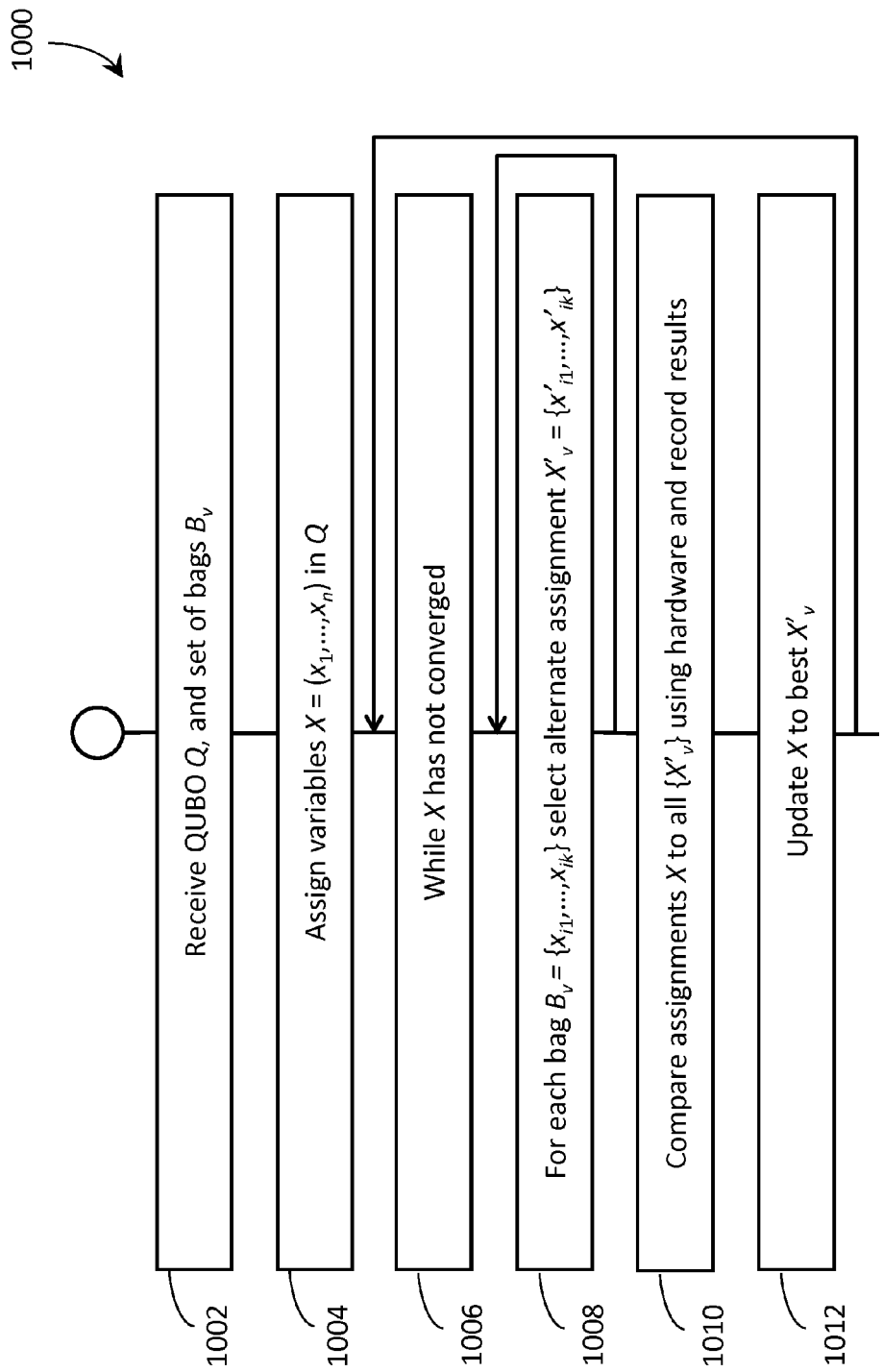
FIG. 10 is a flow-diagram showing a method for using local searches to find an optimal solution to QUBOs, according to at least one implementation of the present systems and methods.

The description will return to how hardware decompositions may be used to solve QUBOs at FIG. 10. Shown in FIGS. 4-9 are methods and examples of how hardware decompositions can be found. These decompositions are used in FIG. 10 to solve a QUBO.

Determining whether or not one graph has a minor-embedding in another is an NP-complete problem; this shows that finding a decomposition of minimal bag-width is hard in general. Since given hardware graph, such as a Chimera graph, is fixed, the graph-minors theorem implies that there is a technique for determining if G is a minor of $G_H$ which has running time polynomial in |V|. However, there is no known construction for that algorithm, and all of the known exact algorithms for determining minors are much too slow to be of any practical use. Instead, a heuristic method is used to build hardware decompositions. In general, the bag-width of these decompositions is not minimal but also not impractically large, and the method is fast enough to be applied to problems on the current scale of interest.

Figure 4:
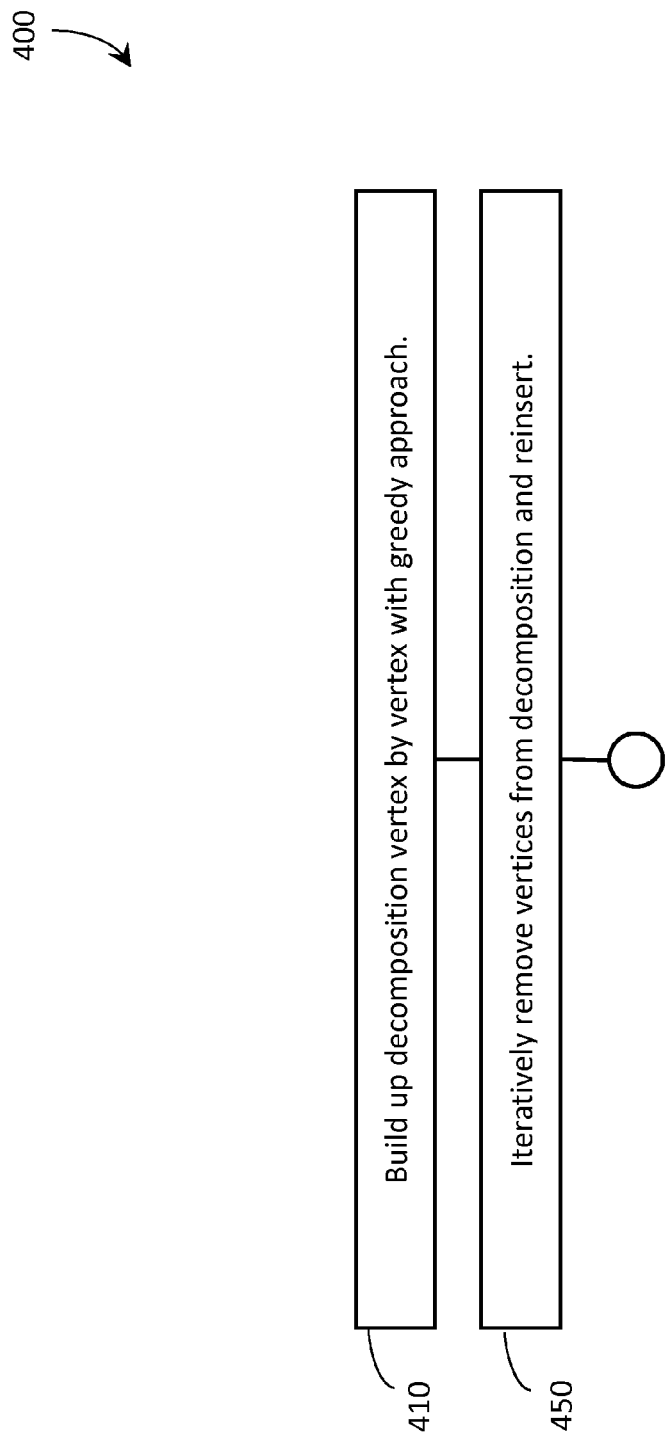
FIG. 4 is a flow-diagram showing two stages of a method to find a hardware graph decomposition for a primal graph, according to at least one implementation of the present systems and methods.

FIG. 4 is a flow-diagram showing two stages of a method 400 to find a hardware graph decomposition for a primal graph. The method 400 works in two stages: 410 and 450. In the first stage 410, a decomposition finder greedily builds up a hardware decomposition of G, vertex by vertex. As each vertex is added the finder has a partial decomposition of G. A partial decomposition of G is a specific hardware decomposition of the subgraphs of the primal graph G induced by vertices added so far. The method 400 is greedy in that the addition of a vertex from the hardware graph $G_H$ to avoid increasing a measure in the decomposition such as in the bag size or chain length. In the second stage 450, the method rectifies the greedy deficiencies of the first stage 410. The decomposition finder tries to improve the current decomposition using a local search. The decomposition finder iteratively removes a vertex of G from the decomposition and then reinserts it, hopefully in a better place. The method 400 is summarized below:

| findChimeraDecomposition(G) |
| --- |
| Stage 1: |
| order V(G) as $(v_1,...,v_n)$ |
| D = decomposition of empty graph |
| for i from 1 to n do |
|     add $v_i$ to decomposition D of $G[v_1,...,v_{i-1}]$ |
| Stage 2: |
| while bag-width(D) is Improved |
|     for i from 1 to n do |
|         remove $v_i$ from D |
|         add $v_i$ to decomposition D of $G[V\backslash v_i]$ | where $V\backslash v_i$ denotes $v_i$ not in V.

where $V\backslash v_i$ denotes $v_i$ not in V.

Figure 5:
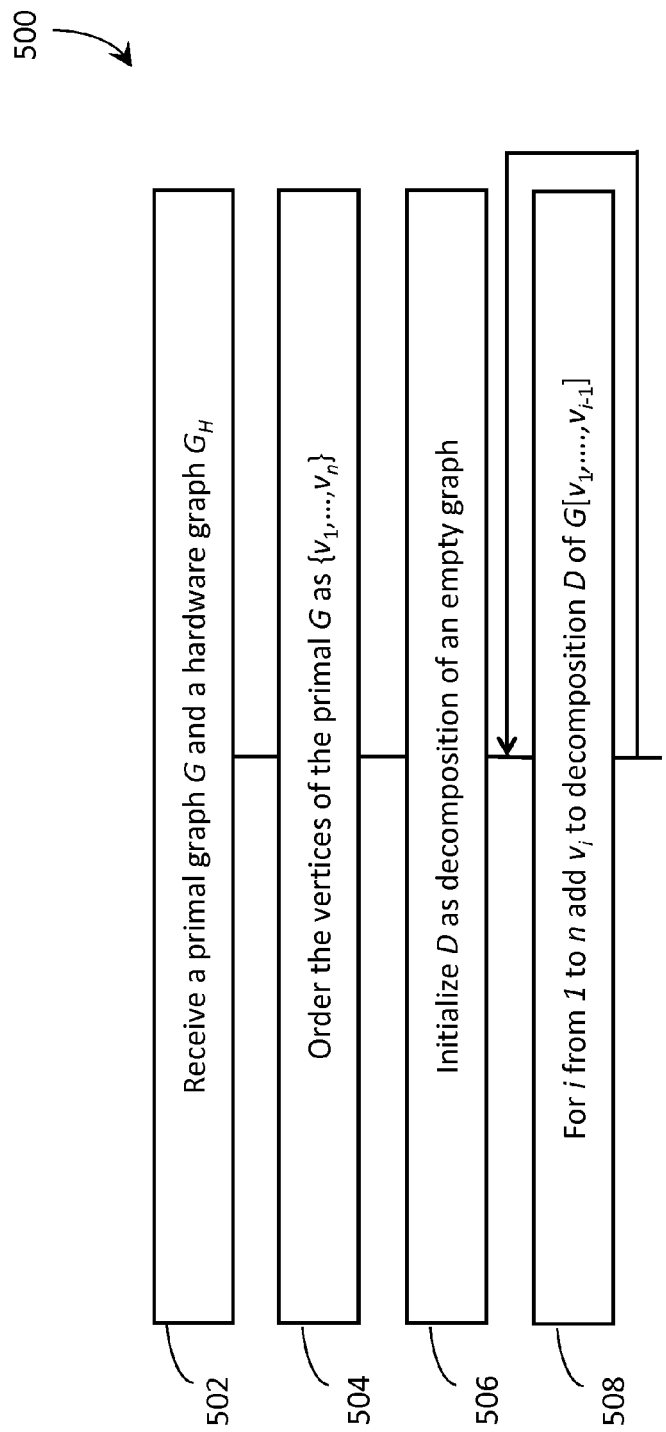
FIG. 5 is a flow-diagram showing the first stage of the method illustrated in FIG. 4.

FIG. 5 is a flow-diagram showing a method 600 as an example of the first stage FIG. 4. At 502 the decomposition finder receives a primal graph G. The primal graph may be called a problem graph as it encodes a problem. Also at 502 the hardware graph $G_H$ is received. At 504 the decomposition finder orders the vertices of the primal graph into a set. At 506 the decomposition finder creates an empty decomposition, D. A non-empty decomposition D includes a list of chains. At 508 a for loop over an index corresponding to the number of vertices in the primal graph starts. Each vertex is added to the decomposition D of the induced sub-graph $G[v_1, \ldots, v_{i-1}]$. As a decomposition is a list of chains the addition includes determining which chain to add the vertex to and including forming a new chain. This is done in a greedy fashion using one or more heuristics as described below. As the for loop progresses the induced sub-graph approaches the primal graph G. Method 500 returns a decomposition D of primal graph G, e.g., decomposition 300 from FIG. 3.

Figure 6:
FIG. 6 is a flow-diagram showing the second stage of the method illustrated in FIG. 4.

FIG. 6 is a flow-diagram showing a method 600 as an example of the second stage FIG. 4. At 602 a decomposition finders receives a primal graph G, a hardware graph $G_H$, and a decomposition D. At 602 a while loop based on a measure begins. In some embodiments loop terminates if the measure does not improve after the last iteration. In some embodiments the loop terminates if the measure has not improved after a set number of iterations. In some embodiments the measure is allowed to worsen before the loop terminates. In some embodiments, the measure is maximum bag-width of the decomposition. In some embodiments, the measure is the sum of the bag-widths of the decomposition. In some embodiments, the measure is the chain length within the decomposition.

At 604 the decomposition finder starts a for loop over an index corresponding to the number of vertices in the primal graph. In the body of the loop, at 606, a vertex corresponding to the current index is removed from the decomposition, D. At 608 the removed vertex is re-added to the decomposition, D, of the primal graph without the removed vertex, $G[V\backslash v_i]$. Unlike in method 500 the adding of the vertex to a decomposition is to the primal graph without the removed vertex, $G[V\backslash v_i]$, and not the induced subgraph $G[v_1, \ldots, v_{i-1}]$. The re-addition of the vertex hopefully improves the measure governing while loop 502.

Both stages 410 and 450 of method 400 of the method use a heuristic that, given a partial decomposition of G, extends it to include one more vertex. See, for example, 508 in method 500 and 608 in method 600. This heuristic is described.

A decomposition of an induced subgraph $G[v_1, \ldots, v_{i-1}]$ is a list of chains $S_1, \ldots, S_{i-1}$ in $G_H$ such that every edge $v_j v_k$ of $G[v_1, \ldots, v_{i-1}]$ is represented. This representation is either as a vertex in $S_j \cap S_k$ or as an edge between $S_j$ and $S_k$. For the decomposition finder to add a new chain $S_i$ in such a way that every edge between $v_i$ and $\{v_i, \ldots, v_{i-1}\}$ is represented, yet the bag sizes of the partial decomposition do not increase too much. More precisely, the decomposition finder seeks a connected subgraph $S_i$ in G of minimal size such that $S_i$ contains a vertex in or adjacent to a vertex in $S_j$, for every neighboring pair, $v_j \sim v_i$.

This problem of finding a minimal subgraph which connects a fixed set of vertices in a graph is known as the Steiner Tree problem and is itself NP-complete. However, the problem can be efficiently approximated to within a constant factor of the optimal solution. Here the decomposition finder approximates Steiner trees using a union of shortest paths.

As would be understood to a person of skill in the art, a Steiner tree is related to the minimum Steiner tree problem, is a problem in combinatorial optimization, to find the shortest interconnect for a given set of objects. Given an edge-weighted graph G=(V, E, w) and a subset $S \subseteq V$ of required vertices. A Steiner tree is a tree in G that spans all vertices of S. (A minimum spanning tree is one that spans V). There are two versions of the problem: in the optimization problem to find a minimum-weight Steiner tree, and in the decision problem, given a value k the task is to determine whether a Steiner tree of total weight at most k exists.

The decomposition finder's heuristic for adding $v_i$ is the following. Let $v_j$ be a neighbor of $v_i$, and let $S_j$ be the subgraph for $v_j$ in the partial decomposition. First, find the shortest path from $S_j$ to every other vertex v in $G_H$. This can be done efficiently using Djikstra's algorithm. Let c(v, j) denote the length of that shortest path from $S_j$ to v. Repeat this for every neighbor $v_j$, and sum the lengths c(v, j) over all j to obtain a cost of each vertex v. Choose v of minimal cost, along with its paths to each $S_j$, to be the subgraph $S_i$ representing $v_i$. This procedure is illustrated in FIG. 7.

Figure 7:
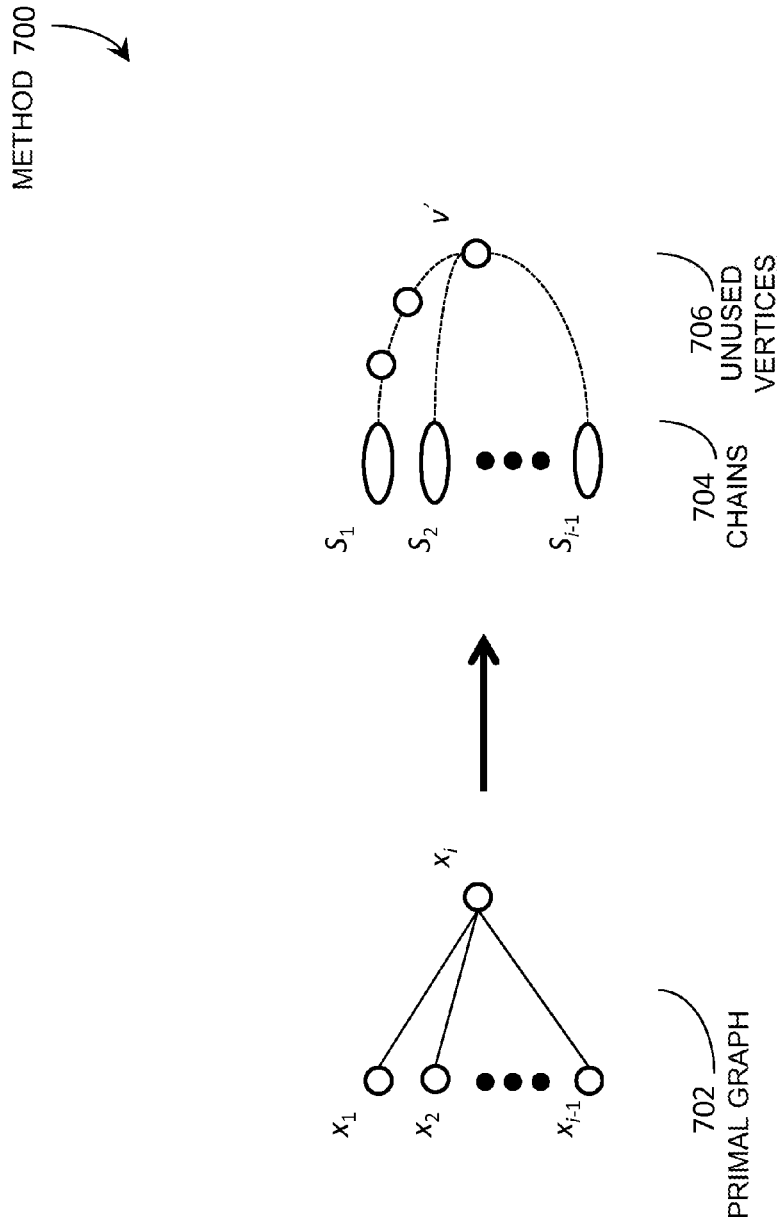
FIG. 7 illustrates an exemplary method of selecting a root of a new chain, according to at least one implementation of the present systems and methods.

FIG. 7 illustrates an exemplary method 700 of selecting a root of a new chain. A primal graph 702 is shown. The vertices are labeled x to denote these are variables. The adjacencies of the variables are shown. The decomposition finder is desirous of finding a new root of a chain for variable $x_i$ within the qubits in the hardware graph. In the example of FIG. 7, a set of chains $S_1$ through $S_{i-1}$ is known and shown at 704. Adjacent to the chains are a plurality of unused vertices 706 with generic vertex v. Let c(v, j) denote the length of weighted path from $S_j$ to the generic vertex v in the hardware graph. Let c(v) be the sum of the lengths over all the chains, as indexed by j. First, compute the shortest-path distance from $S_i$ to every unused vertex v in the subgraph of the hardware graph $G_H$ that has yet to be added to a chain. Record this information as c(v, j). Then compute c(v). Next choose the vertex v that has the smallest total sum of distances c(v). If there is no vertex v that has a path to every chain using only unused vertices, then the heuristic fails. Once the vertex v is selected the paths from the chains to the vertex are unioned. This union operation can result in a cycle.

In practice, there are refinements which improve the performance of this method. These are enumerated below. As the decomposition finder is concerned about the size of the largest bag in the decomposition, while embodiments of the method as stated attempts to minimize the sum of the sizes of the bags. For this reason, in some embodiments the shortest paths calculation is replaced with a weighted shortest paths calculation. Each vertex in $G_H$ is given a weight such that the selection of a vertex that increases a bag size greatly increases the calculated length. In some embodiments, the weight is proportional to an exponentiation of a function in the bag size. For example, $$\mathrm{wt}(v) \propto b^{f(|B_v|)} \quad (4)$$

Where b is the base of the exponent and is, for example, the number of qubits in the hardware graph; and f is a function in the bag size. In practice this allows the shortest paths to avoid large bags for as long as possible.

Another refinement includes removing cycles. Note that by choosing $S_i$ to be a union of paths, $S_i$ may in fact contain cycles: clearly this is a suboptimal approximation to a Steiner tree. When the union of two paths contains a cycle, we remove the part of the cycle coming from one of the paths. This can be done efficiently without affecting the connectivity of $S_i$.

Figure 8:
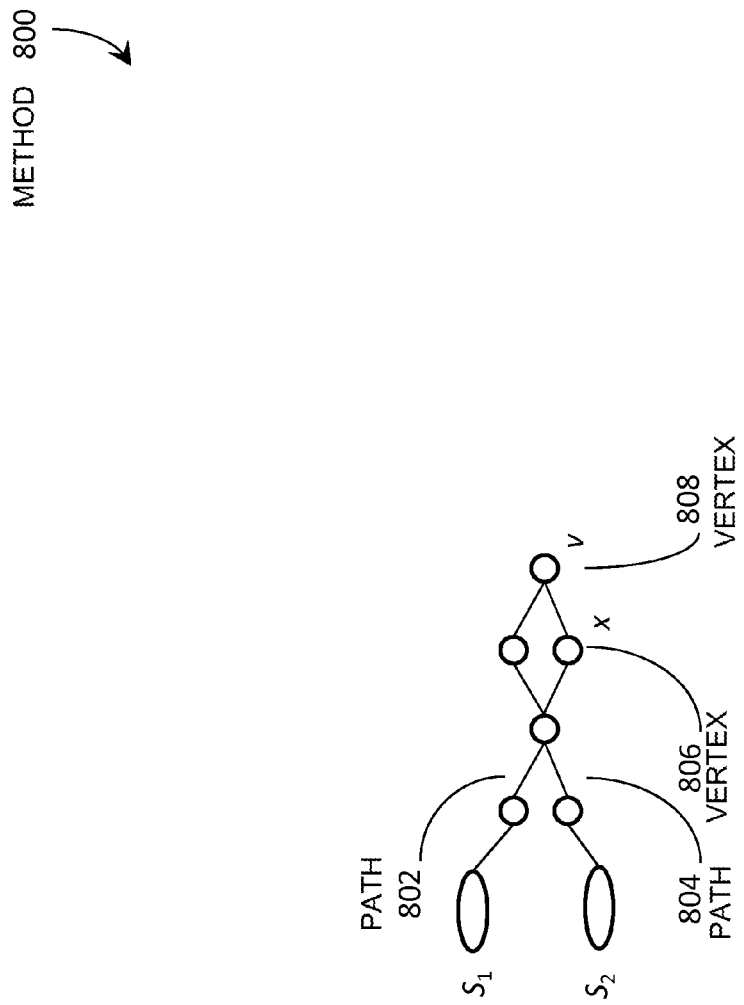
FIG. 8 illustrates an exemplary method of removing a portion of a cycle formed by the union of two chains, according to at least one implementation of the present systems and methods.

FIG. 8 illustrates an exemplary input to a method for removing a portion of a cycle formed by the union of two paths. The addition of a vertex can result in a cycle. If a cycle is detected this can be removed. For example if there is a path 802 from chain 1 to vertex 808 and there is a path 804 from chain 2 to vertex 808. If the union of the paths includes a cycle, the cycle can be removed. For example, removing vertex 806 from path 804.

Another refinement includes dealing with a choice of which chain to add a vertex to. Note that after selecting a vertex v with shortest paths to represent $S_i$, the vertices on the path from v to a neighbor $S_j$ could in fact be added to the subgraph $S_j$ rather than $S_i$. The decomposition finder choses which chain to add vertices to by the following heuristic. If a vertex u appears in more than one shortest path, say the paths to $S_j$ and $S_k$, then u is added to $S_i$. (This is preferable to adding u to both $S_j$ and $S_k$, as it only increases the bag size of u by 1 rather than 2.) On the other hand, a vertex u that appears in only a single shortest path, say the path to $S_j$, then u is added to $S_j$. (The motivation for this choice is that u may lead to shorter paths to the neighbors of $v_j$ other than $v_i$.) FIG. 9 illustrates an exemplary method of adding a chain 906 to a decomposition including chains 902 and 904.

In some embodiments, the method 400 terminates when second stage 450 stops improving (i.e. deleting and reintroducing a vertex in the decomposition no longer leads to smaller bag sizes). In fact, the method performs better using a "tabu" heuristic described here and above. The second stage 450 is allowed to get worse before it gets better. The method terminates if no improvement is seen after a fixed number of iterations.

Several aspects of the method 400 may be randomized. For example, the initial order of the vertices of G in the first stage 410. As well the choice of paths in the decomposition when paths have equal weight can be decided at random. The choice of exponent in weighting shortest paths can be selected at random. The method is most effective when it is run repeatedly over different random choices of these parameters.

FIG. 10 is a flow-diagram showing a method 1000 for using local searches to find an optimal solution to QUBOs. The solving of QUBOS is one way in which hardware decompositions can be used.

At 1002, a QUBO solver receives a QUBO Q, and a set of bags $B_q$. The set of bags is the output of the decomposition finder. A first representation of a decomposition is a set of chains that is connected subgraphs. A second representation of a decomposition is a set of bags. A set of chains can be converted to a set of bags and the opposite is possible. See FIG. 3 for an example of bags and chains. For example, as can be read from FIG. 3, the set of bags for decomposition 300 includes {{1,5},{1,5}, ... {9, 13}, ..., {16}}.

At 1004, the QUBO solver assigns an initial truth assignment to the variables in the QUBO problem. This assignment is denoted X. A local search is made for a better truth assignment. Examples of local searches include tabu searches, genetic algorithms, and simulated annealing. While the truth assignment X has not converged the a set of alternative truth assignment is sought at 1006. At 1008 a for loop is made over each bag. An alternative truth assignment is selected and recorded. At 1010, the alternative truth assignments are tested by calling the annealing hardware. For example, the QUBO solver calls the processor portion 100 via computer system 200. At 1012 the results are compared and the best assignment is kept. The best assignment is one that minimizes the QUBO problem. Processing continues at 1002 as long as the while condition holds.

Recall that for each hardware vertex v in a decomposition, we have a bag $B_q = \{v_1, \ldots, v_k\}$ of vertices of $G_H$, where each $x_i$ represents a binary variable $x_i$ in the original QUBO. In order to take advantage of the hardware graph, each qubit (that is, each bag) must be allowed to take on two possible values, the choice between which is decided by quantum annealing. One natural way of selecting two values for a qubit is to let those values correspond to assignments of the original variables in the bag. For example, if $B_q=\{g_1, g_2, g_4, g_7\}$, we might choose the assignments $(x_1; x_2; x_4; x_7)=(1, 0, 1, 1)$ and $(x_1, x_2, x_4, x_7)=(1, 1, 0, 1)$, and the value of qubit v identifies a choice between the two. Once a QUBO solver has selected a pair of variable assignments for each bag, the QUBO solver calls the annealing hardware to simultaneously select the best assignments for all bags. The objective function for this hardware call is found by considering the interactions in the original QUBO between variables that are in the same bag or in adjacent bags. Since each call to the hardware only distinguishes between 2 of the $2^{|B_q|}$ possible assignments for a bag, the QUBO solver may call the hardware many times with different assignment pairs and keep track of the outcomes. In practice we accomplish this by means of a local search: given a current assignment of variables, we heuristically select an alternative assignment of variables for each bag, and let the hardware decide between the current and alternative solutions. The QUBO solver repeats this selection process enough times to ensure that most of the possible variable assignments are considered. The method is summarized below:

---
localSeachWithBags(QUBO Q, bags $\{B_v\}$)

assign variables $X = (x_1,...,x_n)$ in Q (with $x_i \in \{0, 1\}$)
    while X has not converged
        for each $B_v = \{x_{i_1},...,x_{i_k}\}$
            select an alternative assignment $X_v' = \{x_{i_1}',...,x_{i_k}'\}$
            compare assignments X and $\{X_v'\}$ using hardware
            record outcomes and update X

---

Proposed assignments of variables might not be consistent. For example, if the variable $x_1$ appears in two different bags, it might be assigned $x_1=0$ in the first bag and $x_1=1$ in the second bag. If assignments are proposed randomly, inconsistencies are almost certain to occur. Such an assignment of variables does not correspond to a legitimate solution to the original QUBO. There are several techniques to resolve this issue.

A penalty technique could be used. When evaluating proposed variable assignments using the hardware, a large penalty can be constructed for inconsistent assignments in the objective function. This ensures that inconsistent assignments perform worse and are never selected by the hardware. A consistent assignments technique could be used. In selection of alternative variable assignments for each bag, one can ensure that all variable assignments are consistent between bags. For example, once $x'_1=1$ is selected in one bag, the QUBO solver can set $x'_1=1$ in every other bag in which $x_1$ occurs.

A projection technique could be used. Inconsistent variable assignments can be chosen, but then inconsistencies are resolved in each iteration of the local search. That is, suppose $x_1$ occurs in three bags, and after calling the hardware two of those bags have assigned $x'_1=1$ and one has assigned $x'_1=1$. Using majority logic decoding the "correct" assignment is $x'_1=1$, and reassign all instances of $x_1$ to that value. A soft inconsistencies technique could be used. We can enforce consistency among variables "softly" by slowly increasing the penalty for inconsistent assignments as the algorithm progresses. Initially variables may be assigned freely so that good assignments of variables within each bag and between adjacent bags may be identified. As the penalty is increased, there is a trade-off between good assignments and consistent assignments. When the algorithm terminates, the assignments should be both consistent and close to optimal.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the commonly assigned US patent application publications, US patent applications, foreign patents, foreign patent applications and non-patent publications referred to in this specification and/or listed in the Application Data Sheet, including but not limited to U.S. Provisional Patent Application No. 61/738,961, filed Dec. 18, 2012 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for finding a decomposition for a primal graph having a number of vertices and a number of edges given a hardware specific graph, the hardware specific graph representing a target processor comprising qubits coupleable by couplers, the hardware specific graph comprising a plurality of vertices corresponding to qubits coupleable via a number of edges represented by couplers, the method comprising:

in a first stage, building a decomposition of the primal graph, by at least one circuit, given a hardware specific graph, the building by:
    sequentially adding each vertex in the primal graph to the decomposition,
    wherein:
        each vertex in the primal graph is associated with a connected subgraph in a set of connected subgraphs that is a first representation of the decomposition,
        each edge in the primal graph is represented as a path from a first respective connected subgraph and a second respective connected subgraph, and
        for each vertex, sequentially adding the vertex in the primal graph to the decomposition minimizes a measure of the decomposition via execution of a greedy algorithm;
    in a second stage, following the first stage, refining, by the at least one circuit, the decomposition created in the first stage by:
        removing in sequence each vertex from the decomposition,
        re-adding the vertex into the decomposition to minimize the measure of the decomposition;
    returning the decomposition as a problem formulation executable by the target processor; and embedding the problem formulation on the target processor by configuring at least one of the qubits and the couplers of the target processor based on at least one of the vertices and edges of the decomposition;

wherein configuring the at least one of the qubits and couplers comprises communicatively coupling a first qubit corresponding to a first vertex of the problem formulation to a second qubit corresponding to a second vertex of the problem formulation by a first coupler corresponding to a first edge of the problem formulation.

2. The method of claim 1 further comprising:
receiving the primal graph and the hardware specific graph.

3. The method of claim 1 wherein the hardware specific graph is a Chimera graph.

4. The method of claim 1 wherein the measure of the decomposition is over the first representation of the decomposition.

5. The method of claim 4 wherein the measure of the decomposition over the first representation of the decomposition is proportional to the length of the set of connected subgraphs.

6. The method of claim 1 wherein the measure of the decomposition is over a second representation of the decomposition, the second representation of the decomposition is a plurality of bags, and each bag is a set of one or more variables represented at one or more qubits that includes a respective bag-width.

7. The method of claim 6 wherein the measure of the decomposition over the second representation of the decomposition includes a summation over the bag-width of the decomposition.

8. The method of claim 6 wherein the measure of the decomposition over the second representation of the decomposition includes a maximum bag-width of the bag-width of the decomposition.

9. The method of claim 1 wherein the measure of the decomposition is over a second representation of the decomposition and includes a maximum bag-width of a number of bag-widths of the decomposition.

10. The method of claim 1 wherein sequentially adding each vertex in the primal graph to the decomposition further comprises:
finding a minimum cost qubit of the hardware specific graph; and
finding a weighted shortest path through a set of unused vertices in the hardware specific graph.

11. The method of claim 1 wherein the primal graph is associated with a quadratic unconstrained binary optimization (QUBO) problem, the hardware specific graph is representative of at least one quantum processor that includes a plurality of qubits and a plurality of couplers.

12. The method of claim 1, further comprising:
assigning a truth assignment to a plurality of variables associated with the primal graph by the at least one circuit;
while the truth assignment has not converged:
for each bag in a plurality of bags, conducting a local search from the truth assignment to generate a candidate set of new truth assignments by the at least one circuit;
comparing the truth assignment to the candidate set of new truth assignments by the at least one circuit; and
updating the truth assignment with the best of the candidate set of truth assignments if a new truth assignment from the candidate set of new truth assignments is better than the truth assignment by the at least one circuit.

* * * * *